(12) United States Patent
Seidl

(10) Patent No.: US 9,337,761 B1
(45) Date of Patent: May 10, 2016

(54) GENERATOR EXCITATION REGULATION USING PULSE WIDTH MODULATION

(71) Applicant: Infineon Technologies AG, Neubiberg (DE)

(72) Inventor: Christoph Seidl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1 day.

(21) Appl. No.: 14/550,602

(22) Filed: Nov. 21, 2014

(51) Int. Cl.
*H02P 11/00* (2006.01)
*H02H 7/06* (2006.01)
*H02P 9/00* (2006.01)
*H02P 9/30* (2006.01)
*H02J 1/00* (2006.01)
*H02J 3/00* (2006.01)

(52) U.S. Cl.
CPC ................................ *H02P 9/305* (2013.01)

(58) Field of Classification Search
USPC .................... 322/7, 22, 28; 318/599
See application file for complete search history.

(56) References Cited

U.S. PATENT DOCUMENTS

| | | | | |
|---|---|---|---|---|
| 3,652,912 A * | 3/1972 | Bordonaro | ............... | G05D 3/18 318/599 |
| 3,932,735 A * | 1/1976 | Giras | ............... | H02J 3/00 376/215 |
| 3,979,654 A * | 9/1976 | Guicheteau | ............... | G05D 7/06 318/599 |
| 4,264,960 A * | 4/1981 | Gurr | ............... | H02J 3/14 307/40 |
| 5,113,158 A * | 5/1992 | Tsuji | ............... | H03K 7/08 318/599 |
| 5,162,987 A * | 11/1992 | Sambhu | ............... | G05B 11/26 318/599 |
| 5,225,973 A * | 7/1993 | Patel | ............... | H02M 7/49 322/28 |
| 5,731,688 A * | 3/1998 | Thomson | ............... | H02J 3/38 290/40 B |
| 5,734,255 A * | 3/1998 | Thompson | ............... | H02J 3/38 290/2 |
| 5,754,033 A * | 5/1998 | Thomson | ............... | H02J 3/38 307/57 |
| 5,973,481 A * | 10/1999 | Thompson | ............... | H02J 3/38 290/2 |
| 6,498,462 B2 * | 12/2002 | Ballantine | ............... | H02J 3/38 290/40 B |
| 6,535,797 B1 * | 3/2003 | Bowles | ............... | H02J 3/00 700/286 |
| 6,630,816 B2 * | 10/2003 | Kotani | ............... | H02J 3/38 322/17 |
| 6,653,821 B2 * | 11/2003 | Kern | ............... | H02J 9/066 290/40 B |
| 6,914,763 B2 * | 7/2005 | Reedy | ............... | H02H 7/262 361/64 |
| 7,235,891 B2 * | 6/2007 | Tokiwa | ............... | H02J 3/38 290/10 |
| 7,514,808 B2 * | 4/2009 | Wobben | ............... | F03D 9/00 290/40 A |
| 8,203,317 B2 * | 6/2012 | Auer | ............... | H02P 9/48 322/28 |
| 2009/0218991 A1 * | 9/2009 | Eaton | ............... | H02P 9/305 322/28 |
| 2010/0244787 A1 * | 9/2010 | Auer | ............... | H02P 9/48 322/28 |

* cited by examiner

*Primary Examiner* — Pedro J Cuevas
(74) *Attorney, Agent, or Firm* — Shumaker & Sieffert, P.A.

(57) ABSTRACT

A system may be configured to provide a regulated generator field current to a generator to acquire a regulated output voltage of the generator. In one example, the system comprises a controller configured to provide an actuator control signal on the basis of an error signal, an actuator configured to provide on the basis of the actuator control signal a pulse-width modulated output voltage that is configured to drive the regulated generator field current into the generator, the pulse-width modulated output signal having a duty cycle controlled by the actuator control signal, and an error evaluator configured to provide the error signal based on a combination of a first deviation signal and a second deviation signal.

22 Claims, 7 Drawing Sheets

GENERATOR EXCITATION REGULATION USING PULSE WIDTH MODULATION

TECHNICAL FIELD

The present disclosure relates to a concept for providing a regulated, limited generator field current to a generator to obtain a regulated output voltage of the generator, as may be employed, in particular, for providing a regulated voltage at a voltage generator within a motor vehicle.

BACKGROUND

For supplying electronic components within a motor vehicle, a generator such as an alternator, is generally used in combination with a vehicle battery. The generator, or alternator is driven by a running motor as a secondary unit. The drive may be effected, for example, by means of a belt drive or directly via a crankshaft. With a driven alternator, a current is provided by the same, for example for charging the vehicle battery and for loads connected to an on-board network. The alternator transforms mechanical energy provided by the motor into electric energy, the mechanical power necessary being approximately proportional to the electrical power output. A non-regulated voltage provided by an alternator strongly varies with the rate of rotation of the motor and the load connected. Since an alternator should be able to build up the nominal voltage of the motor vehicle on-board network already at a low motor speed, it is generally oversized. To keep it from exceeding, as a consequence, an admissible final charging voltage of the vehicle battery in the event of a high rate of rotation, the voltage is generally limited to a maximum value by a regulator.

With three-phase current alternators, the electrically generated excitation field of the driven alternator rotor is influenced by an electronic charging regulator. The regulator generally measures a rectified actual voltage at the output of the generator using a regulator-internal stable reference voltage compares the measured voltage with a setpoint voltage value, and adjusts the strength of the excitation field by means of a higher or lower level of generator field current, flowing through the rotor such that the actual voltage of the generator remains at least approximately constant, independently of load and speed. Conventionally, the generator output voltage is regulated and the generator field current may be limited by the regulator.

SUMMARY

An exemplary system is configured to provide a regulated generator field current to a generator to acquire a regulated output voltage of the generator. The system comprises a controller configured to provide an actuator control signal on the basis of an error signal and an actuator configured to provide, on the basis of the actuator control signal, a pulse-width modulated output voltage that is configured to drive the regulated generator field current into the generator, the pulse-width modulated output signal having a duty cycle controlled by the actuator control signal. The system further comprises an error evaluator configured to provide the error signal based on a combination of a first deviation signal and a second deviation signal, wherein the first deviation signal represents a difference between a voltage setpoint value and the generator output voltage, and the second deviation signal represents a difference between a duty cycle limit value and a signal representing the low-pass filtered actuator control signal.

An exemplary method is configured to provide a regulated generator field current to a generator to acquire a regulated output voltage of the generator. The method comprises providing an actuator control signal on the basis of an error signal, and providing on the basis of the actuator control signal a pulse-width modulated output voltage that is configured to drive the regulated generator field current into the generator; the pulse-width modulated output signal having a duty cycle controlled by the actuator control signal. The method further comprises providing the error signal based on a combination of a first deviation signal and a second deviation signal, wherein the first deviation signal represents a difference between a voltage reference signal and a generator output voltage, and the second deviation signal represents a difference between a duty cycle reference signal and a signal representing the low-pass filtered actuator control signal.

Another exemplary system is configured to provide a regulated generator field current to a generator to acquire a regulated output voltage of the generator.

The system comprises a controller configured to provide an actuator control signal on the basis of an error signal and an actuator configured to provide, on the basis of the actuator control signal, a pulse-width modulated output voltage that is configured to drive the regulated generator field current into the generator, the pulse-width modulated output signal having a duty cycle controlled by the actuator control signal. The system further comprises a duty cycle limiter configured to limit the duty cycle of the the pulse-width modulated output signal based on a difference between a duty cycle limit value and a signal representing the low-pass filtered actuator control signal.

Another exemplary method is configured to provide a regulated generator field current to a generator to acquire a regulated output voltage of the generator. The method comprises providing an actuator control signal on the basis of an error signal, and providing on the basis of the actuator control signal a pulse-width modulated output voltage that is configured to drive the regulated generator field current into the generator; the pulse-width modulated output signal having a duty cycle controlled by the actuator control signal. The method further comprises limiting the duty cycle of the the pulse-width modulated output signal based on a difference between a duty cycle reference signal and a signal representing the low-pass filtered actuator control signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following description and drawings. In the figures, like referenced numerals designate corresponding parts throughout the different views.

DETAILED DESCRIPTION

Vehicles with internal combustion engines typically use a Lundell machine as a primary electrical power source. The Lundell machine provides a rugged and economical solution for electrical power supply in vehicles.

Figure 1:
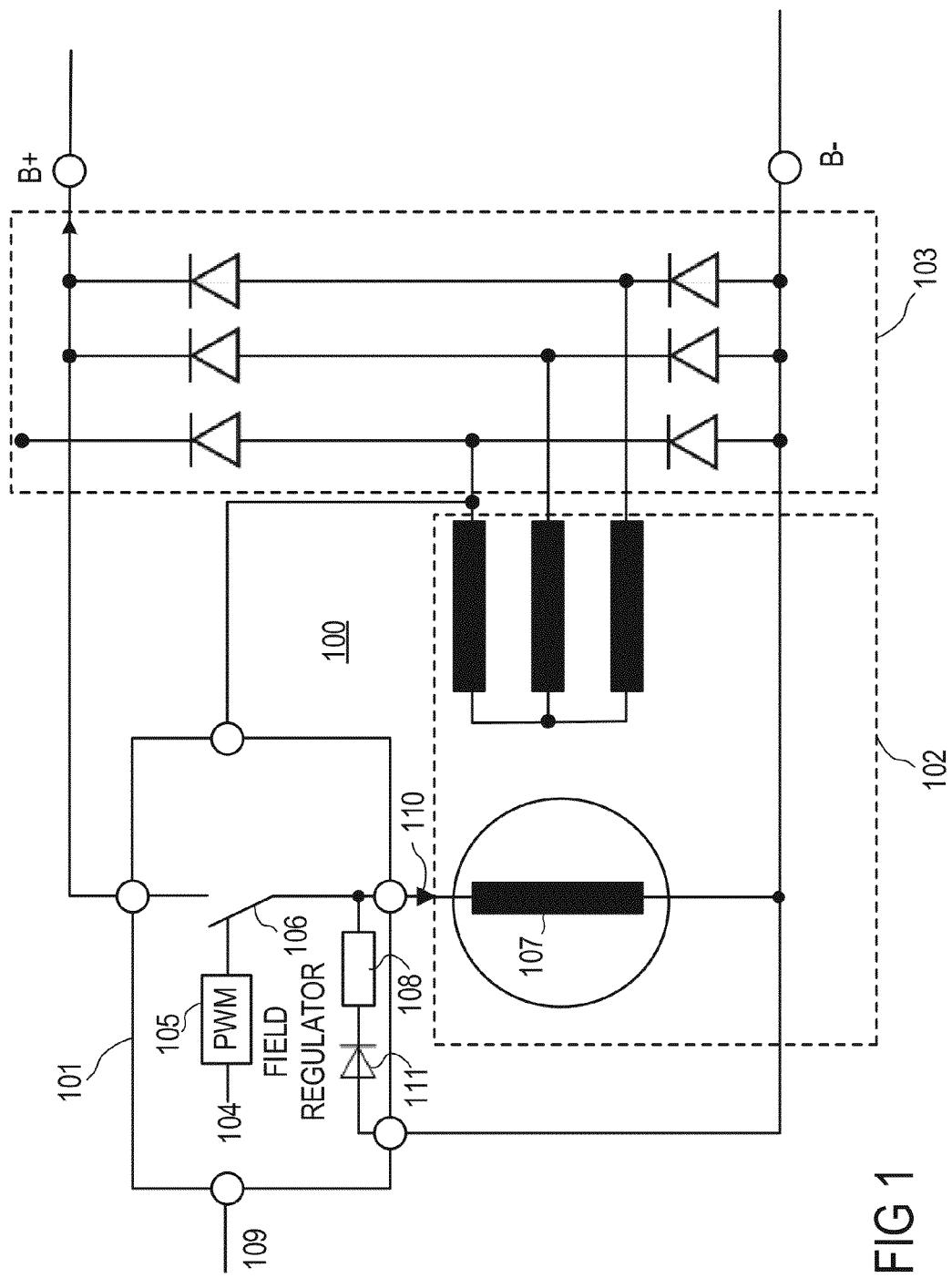
FIG. 1 is a block diagram of an exemplary motor vehicle voltage generator regulator system.

A vehicle electrical generator 100 with a field regulator 101 is shown in FIG. 1. The generator 100 also includes a Lundell alternator 102 (also known as a claw pole alternator), which is a wound-field, 3-phase synchronous machine. The output of the Lundell alternator 102 communicates with a 3-phase bridge rectifier 103 to produce direct current (DC) power.

The field regulator 101 generates internally an error signal based on at least a difference between a terminal voltage (across battery terminals B+ and B− at the output of the 3-phase bridge bridge rectifier 103) and a voltage setpoint (value) 104. The field regulator 101 includes a pulse width modulation (PWM) controller 105 that controls a power transistor 106, whose controlled path is in series with a field winding 107. Pulse-width modulation (PWM), also known as pulse-duration modulation (PDM), is a modulation technique that controls the width (in time) of an electrical pulse, formally the pulse's duration, based on modulator signal information. The term PWM as used herein also includes controlling the time distance between two pulses. An on/off duty cycle of the transistor 106 depends on a field current (also known as excitation current) that is required to maintain an output voltage at a desired level for a given speed and load condition. An optional resistor 108 is connected in series to diode 111, and the series connection of resistor 108 and diode 111 is connected in parallel to the field winding 107 switch, to provide a freewheeling path for the field current when the transistor 106 is switched off. The voltage setpoint 104 may be controlled by way of signals transmitted via a car bus system 109 such as a local interconnect network (LIN) bus or controller area network (CAN) bus.

Figure 2:
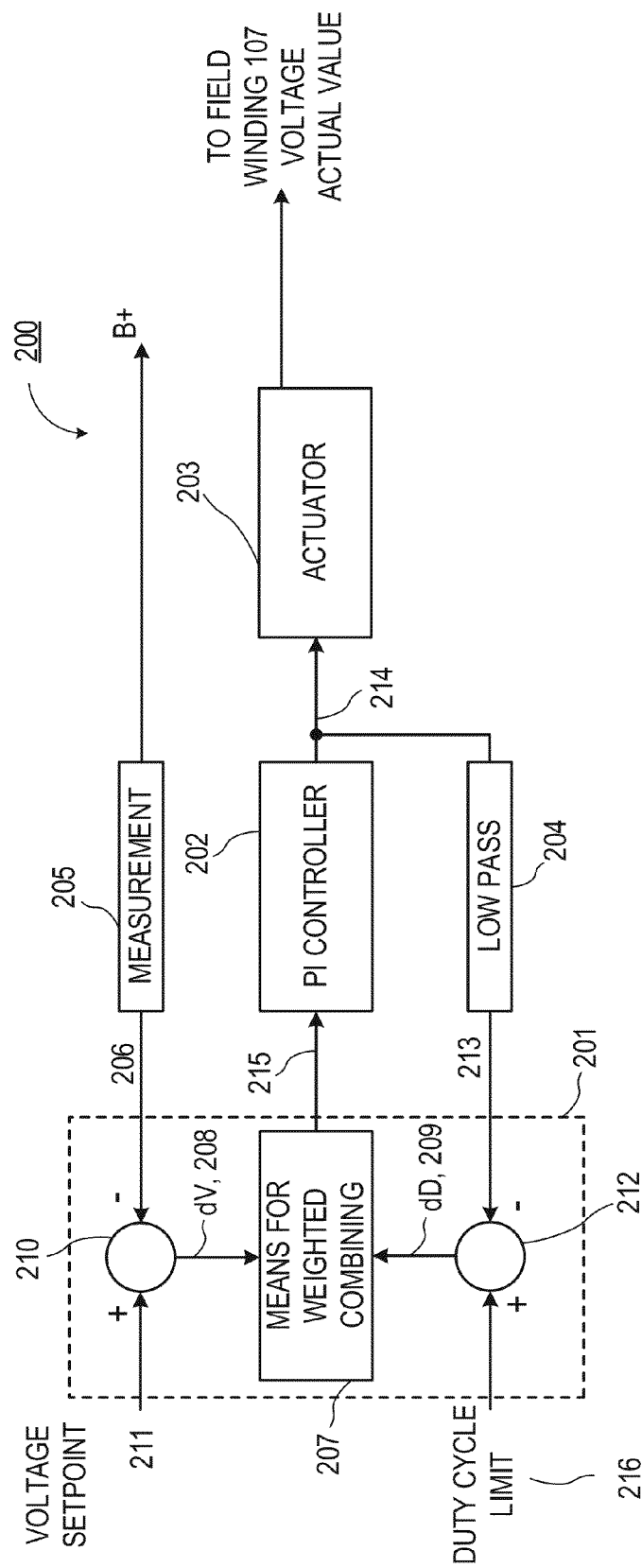
FIG. 2 is a block diagram of an exemplary voltage regulator with duty cycle limitation applicable in the system of FIG. 1.

Referring to FIG. 2, an exemplary field regulator 200 applicable as field regulator 101 in the system shown in FIG. 1 for providing a regulated field current to the generator 100 to obtain a regulated output voltage of the generator 100 includes an error evaluator 201, a proportional-integral (PI) controller 202 connected downstream of the error evaluator 201, an actuator 203 connected downstream of the PI controller 202, a low-pass filter 204 connected downstream of the PI controller 202, and a voltage measurement module 205 which is connected to battery terminal B+ and provides a signal 206 representing the terminal voltage. The error evaluator 201 includes a combiner 207 which is configured to combine, in a weighted manner, a voltage deviation signal 208 and a duty cycle deviation signal 209. Voltage deviation signal 208 is provided by a subtractor 210 which subtracts signal 206 from a setpoint voltage 211 representing voltage setpoint 104. Duty cycle deviation signal 209 is provided by a subtractor 212 which subtracts an output signal 213 of low-pass filter 204 from a duty cycle limit 216. Output signal 213 represents a low-pass filtered output signal of PI controller 202. The output signal of PI controller 202 is herein referred to as actuator control signal 214. An output signal of error evaluator 201, which is an input signal to the PI controller 202, is referred to herein as error signal 215.

The duty cycle limit (value) 216 may represent a maximum duty cycle value and thus relates to the maximum current flowing through the field winding 107 and is referred to herein as field current 110 (see FIG. 1). Combiner 207 determines at least one weighting factor to obtain a weighted influence of the voltage deviation signal 208 and of the duty cycle deviation signal 209 respectively, on the error signal 215. The at least one weighting factor may behave, for example, in a proportional manner to the duty cycle deviation signal 209, and/or in an inversely proportional manner to the voltage deviation signal 208. This means that the larger the duty cycle deviation signal 209, i.e., the larger the deviation of the actual duty cycle value represented by signal 213 from the predefined duty cycle value 216, the larger the weighting factor will be. On the other hand, the larger the voltage deviation signal 204, i.e., the larger the deviation of the terminal voltage across battery terminals B+ and B− from the setpoint voltage value 211, the smaller the weighting factor will be. Alternatively, two (or more) individual weighting factors may be applied to deviation signals 208 and 209.

The weighting factor determined may comprise a lower limitation value $L_L$ and an upper limitation value $L_U$, so that the combination signal, which is error signal 215, depends only on the duty cycle deviation signal 209 when the lower limitation value $L_L$ is reached, and depends only on the voltage deviation signal 208 when the upper limitation value $L_U$ is reached. These dependencies may also be selected the other way round.

Combiner 207 may form the error signal 215 from a combination of a product of the voltage deviation signal 208 with a square portion of the weighting factor, and a product of the duty cycle deviation signal 209 with a linear portion of the weighting factor. This conversion of deviation signals 208, 209 to the regulation input quantity and/or the error signal 215 is conducted differently so that, for example, regulation parameters in the PI controller can remain unchanged. The PI controller 202 is a fusion of a proportional (P) controller and an integral (I) controller. Depending on the implementation of combiner 207 and actuator 203, the PI controller 202 may also comprise different forms of controllers such as, for example, a proportional controller, an integral controller, a differential controller or controllers combined from said controllers. Duty cycle limit 216 represents a targeted maximum duty cycle of a pulse width modulation of the output of actuator 203, i.e., the voltage applied to field winding 107. To this end, combiner 207 or PI controller 202 may be configured to provide a control signal for controlling the duty cycle according to the predefined duty cycle 216.

The field regulator 200 described above with reference to FIG. 2 may be employed, for example, in motor vehicles for controlling the alternator. A duty cycle maximum may be set in addition to a voltage setpoint (value) 211 by way of duty cycle limit 216. For example, a motor control device may limit the mechanical load of the generator in a targeted manner and no current measurement is necessary to limit the current, as is shown in FIG. 2. Accordingly, the duty cycle deviation influences the calculation of the system deviation so that no switch-over between two different regulators (voltage regulator, duty cycle regulator) with unwanted disruptive switch-over effects occur. Thus, two different regulating requirements are implemented using one regulator core. An effective system deviation is formed by combining the two deviations 208 and 209 of two quantities representing the quantities to be regulated, i.e., voltage, duty cycle (current).

For example, the field regulator 200 may be located within a motor control device and may be used to regulate a motor vehicle on-board voltage (voltage battery+ alternator). The voltage setpoint 211 may be predefined by a control device for a 12V on-board network, for example within a range from 10.7 volt to 16 volt in 100 mV steps. The range indicated here is only an example and other voltage ranges such as, for example, voltage ranges between 5V and 60V are applicable as well, including common motor vehicle on-board networks such as 24V or 42V on-board networks. The motor vehicle on-board voltage is generally generated by a 3-phase generator including bridge rectification. The 3 phases are within the stator of the generator, and the rotating field is generated using a rotating field (excitation) coil supplied with a generator field current. The generator field current is supplied via slip rings, for example.

Figure 3:
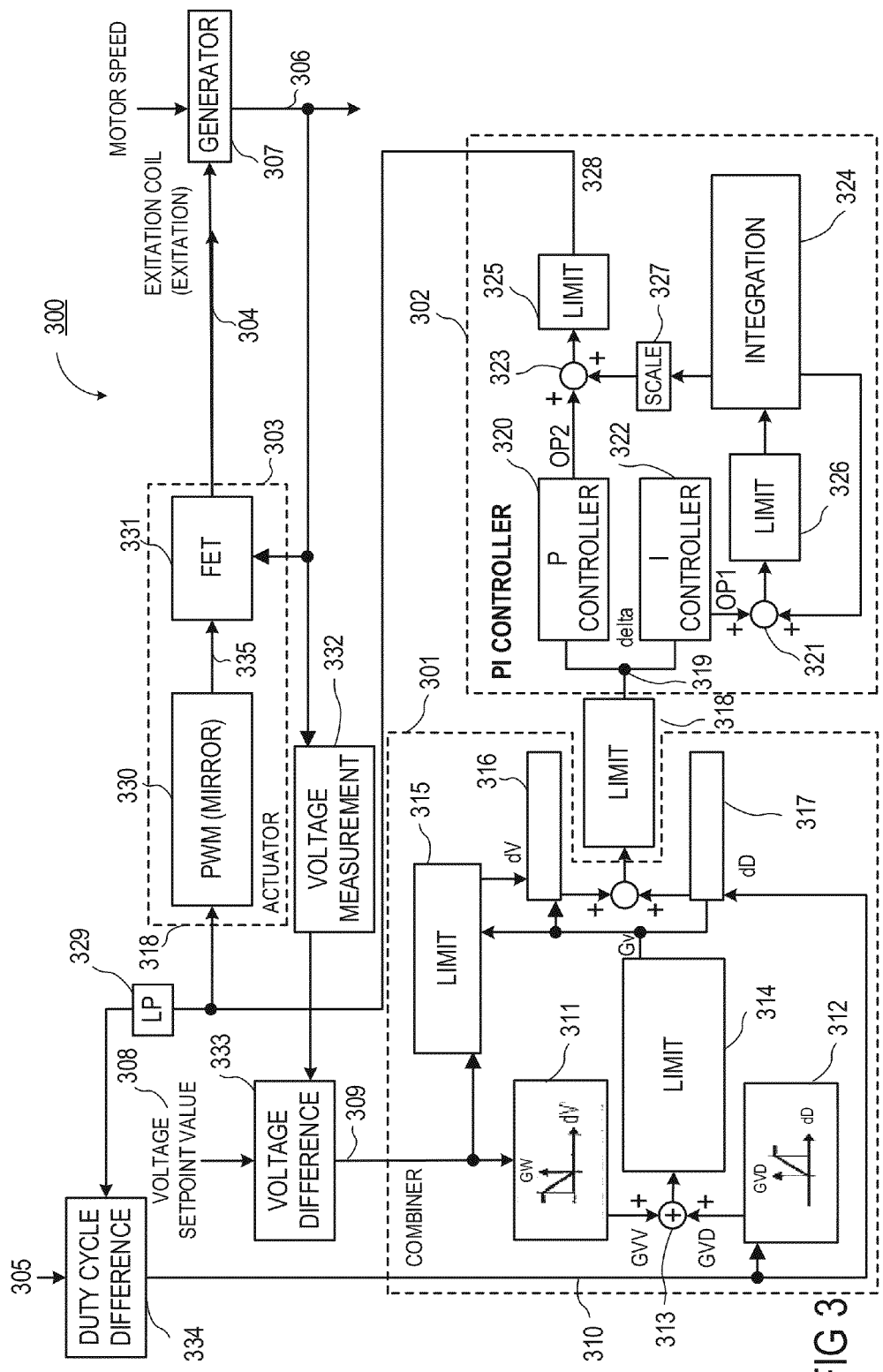
FIG. 3 is a block diagram of another exemplary voltage regulator with duty cycle limitation applicable in the system of FIG. 1.

Referring to FIG. 3, another exemplary control device 300 for providing a regulated, limited generator field current to a generator so as to obtain a regulated output voltage of the generator, comprises a combiner 301 for weighted combining, a PI controller 302, and an actuator 303, for providing the regulated, limited generator field current 304, on the basis of a predefined duty cycle value 305, so that a regulated voltage 306 may be provided by a generator 307. The combiner 301 includes an input for receiving a voltage deviation signal 309, on the basis of a setpoint voltage value 308 and the regulated voltage 306. The ranges of values for the voltage deviation signal 309 depend, for example, on available digital word widths and may be adapted to various specifications. In addition, combiner 301 includes a second input for a duty cycle deviation signal 310, on the basis of the maximum duty cycle set by predefined duty cycle value 305 and the low-pass filtered signal 328 which represents the duty-cycle. The ranges of values for the duty cycle deviation signal 310 depend, for example, on available digital word widths and may be adapted to desired specifications.

Depending on the voltage deviation signal 309, in a block 311, a voltage weighting factor GW is formed which is inversely proportional to the voltage deviation signal 309. If, for example, the voltage deviation signal 309 has a digital value smaller than a value dVmin, the voltage weighting factor GW is set to an upper limitation value $L_U$. From a value of dVmax for the voltage deviation signal 309, a lower limitation value of $L_L$ will result for GW. Thus, GW may be determined in accordance with the following specification:

$$GVV = \begin{cases} L_U, & \text{for } dV \leq dV_{min} \\ L_U - \dfrac{(L_U - L_L)}{dV_{max} - dV_{min}} \cdot dV, & \text{for } dV_{min} < dV < dV_{max} \\ L_L, & \text{for } dV \geq dV_{min} \end{cases}.$$

A duty cycle weighting factor GVD is formed as a function of the duty cycle deviation signal 310 within a block 312, said duty cycle weighting factor GVD being proportional to the duty cycle deviation signal 310. If, for example, the duty cycle deviation signal 310 has a digital value smaller than dDmin, the preliminary weighting factor GVD will be set to the lower limitation value $L_L$. From a value dDmax for the duty cycle deviation signal 310, the upper limitation value of $L_U$ will result for GVD. Here, GVD may thus be determined in accordance with the following specification:

$$GVD = \begin{cases} L_L, & \text{for } dV \leq dV_{min} \\ dD, & \text{for } dD_{min} < dD < dD_{max} \\ L_U, & \text{for } dD \geq dV_{min} \end{cases}.$$

It shall be noted that the functions defined portion-by-portion and indicated in the above equations may also have different forms. The ranges of values for $dV_{min}$, $dV_{max}$, $dD_{min}$, $dD_{max}$, $L_L$ and $L_U$ depend, e.g., on the digital word widths which are available, and may be adapted to various specifications. In addition, the present embodiments are also not limited to digital values, but may also be applied to analog signals.

The preliminary weighting factors GW and GVD present at the outputs of modules 311 and 312 are added by way of an adder 313 to form a weighting factor GV which may be limited to a range of values from $L_L$ to $L_U$ by a block 314. If the duty cycle limitation is to be switched off, weighting factor GV is set to the predefined value of Lu in module 314.

If the weighting factor GV present at the output of module 314 is smaller than the predefined value $L_U$, i.e. GV<$L_U$, the voltage deviation signal 309 will be limited, within a module 315, to a predefined range of values. In a block 316, at whose inputs GV and the dV limited in accordance with block 315 are present, a first intermediate value IV1 is formed in accordance with the specification $$IV1 = \frac{GV^2}{L_U^2} \cdot dV.$$

By way of a block 317, at whose first input GV is present, and at whose second input signal dD 310 is present, a second intermediate value IV2 is formed in accordance with $$IV2 = L_U \cdot (L_U - GV) \cdot dV.$$

The first and second intermediate values IV1 and IV2 are added, and the sum is subsequently limited, in a block 318, to a predefined range of values. An error signal (delta) 319 based on voltage deviation signal 309 and on duty cycle deviation signal 310 is present at the output of block 318.

Error signal 319 (delta) is input into PI controller 302. Within same, error signal 319 is passed into a proportional (P) controller module 320 and into an integral (I) controller module 322. An output signal OP of P controller module 322 is added by an adder 321 with a feed-back signal of an integrator module 324, the resulting sum is limited to a predefined range of values by means of a module 326, and is fed to integrator module 324. Within the integrator module 324, the signal may be accumulated within a predefined range of values, with a given a refresh rate of the integrator stage. An output signal of integrator module 324 is divided, by means of a scaling module 327, by a predefined value and added by an adder 323 with an output signal of P controller module 320. In the process, the output OP2 of P controller module 320 is added by an adder 323 with the output of scaling module 327.

This sum output by adder 323 is limited, by means of a block 325, to a predefined range of values. An output signal 328 of block 325 forms the actuator control signal 335, based on the error signal 319 and on the regulation specification of PI controller 302.

Signal 325 controls a duty cycle of signals output by a pulse width modulator 330 which operates with a given refresh rate and provides, at its output, a pulse width modulated signal having a fixed frequency. With this pulse-width-modulated signal, a regulating transistor, or high-side transistor, 331 is controlled, which at the same time is supplied via the regulated motor vehicle on-board voltage, i.e., generator output voltage 306. Regulating transistor 331 may be a field-effect or a bipolar transistor, for example. The generator field current provided by regulating transistor 331 is fed, in a pulse-by-pulse manner, to an excitation coil (not shown) of generator 307. Thereby, the generator field current is smoothed by the inductance and resistor of the excitation coil. Voltage 306 which is dependent on the motor speed and the field current is measured by means of a module 332 and is subsequently supplied to a subtractor module 333, which receives also the voltage setpoint value 308 for forming the voltage deviation signal 309. The signal 328 is further supplied via a low-pass filter 329 to a subtractor module 334 which receives also the predetermined duty cycle value 305 for forming the duty cycle deviation signal 310. The low-pass filter 329 has characteristics that model the smoothing characteristic of the inductance and resistor of the excitation coil.

Weighting factor GV is calculated in the manner described above within combiner 301. This factor establishes the extent to which system deviation dV 309 of the voltage is allowed to determine the regulator input quantity and/or the combination signal 316. In accordance with one embodiment, there may be three operating states: only voltage regulator is active, only duty cycle regulation (duty cycle limitation) is active or regulator is in a transition from voltage to duty cycle regulation.

The conversion of the system deviations dV 309 and/or dD 310 to the regulation input quantity and/or the combination signal delta 319 is conducted differently, so that regulation parameters of the I controller module 320 and the P controller module 322 can remain the same. The influence of the voltage deviation signal dV 309 is determined, in accordance with an embodiment, by a square influence of weighting factor GV on combination signal delta 319, whereas duty cycle deviation signal 310 is merely weighted linearly with weighting factor GV. In accordance with the circumstances and with further embodiments, there may also exist a different connection between dV 309 and/or dD 310, GV and delta 319.

The duty cycle limitation function of the control device, depicted in FIG. 3, for providing a regulated, limited duty cycle of the generator field current may also be deactivated. This may be implemented, for example, in that weighting factor GV is set to its maximum value Lu, and in that no more calculation of weighting factor GV, as described above, is conducted. Duty cycle difference dD 310 will then have no influence on the regulator input quantity delta 319. If the regulator circuit shown in FIG. 3 is in the combiner mode, setpoint voltage value 308 will generally not be fully achieved.

In automotive systems two basic approaches are widely used to regulate the output voltage of a generator. One approach is to control the maximum output current according to a family of characteristics in which the output current is linked to the generator revolutions per time period and the excitation current. Another approach is to control the maximum output current by controlling the duty cycle of the field current instead of the field current itself. Common generators only allow for current limitation so that, for example, a duty cycle controlled model has to be transferred into a current controlled model by, e.g., a vehicle electronic control unit (ECU). The systems and methods described above in connection with FIGS. 2 and 3 include duty cycle based limiting, so that an ECU which employs a duty cycle based model needs not transfer the duty cycle based model into a current based model. In contrast to the common approaches, the systems and methods described above in connection with FIGS. 2 and 3 model not only the static, but also the dynamic control characteristics of the generator in a duty cycle based model.

Figure 4:
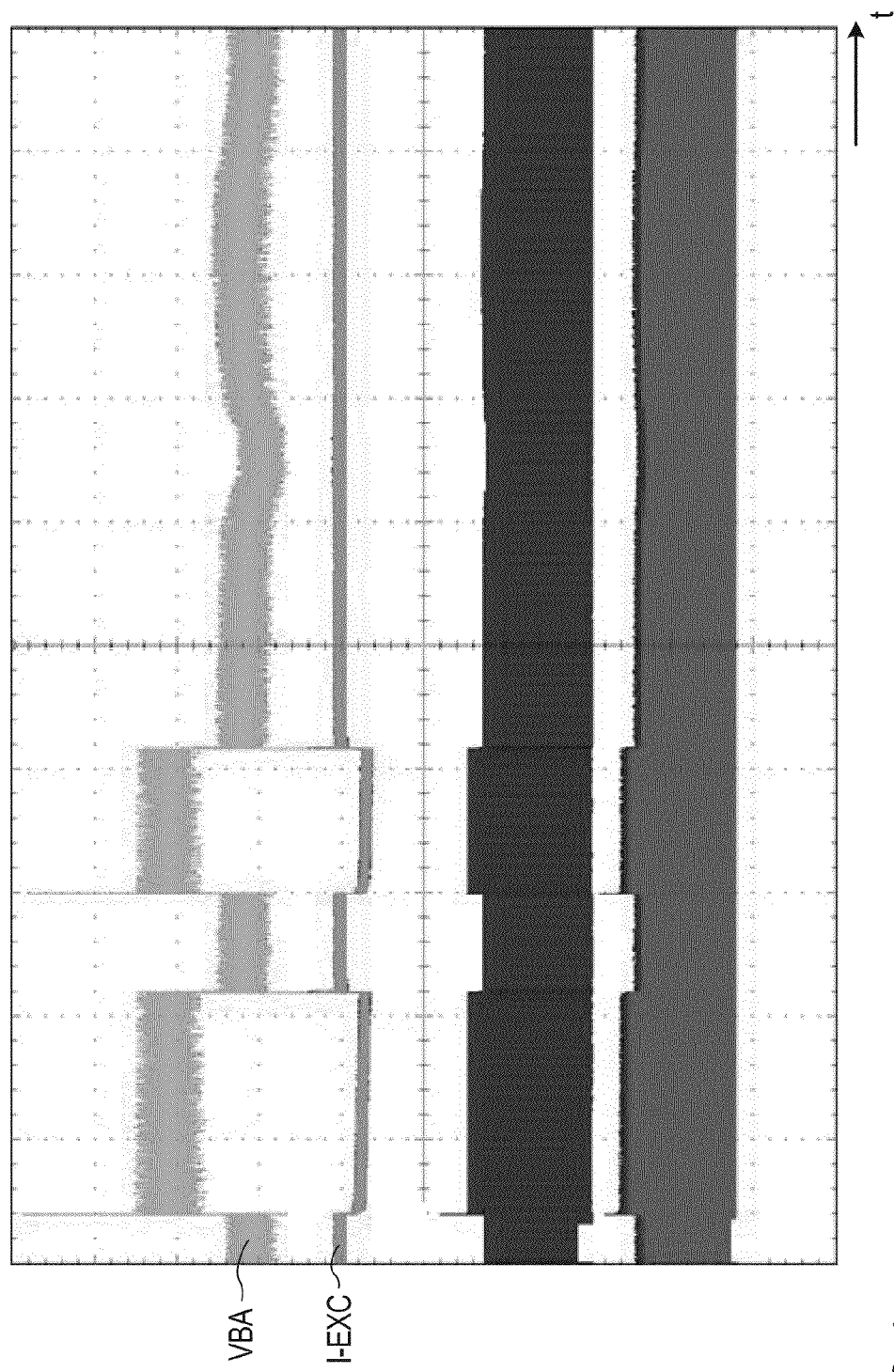
FIG. 4 is a diagram illustrating dynamic current regulation employing current limitation.
Figure 5:
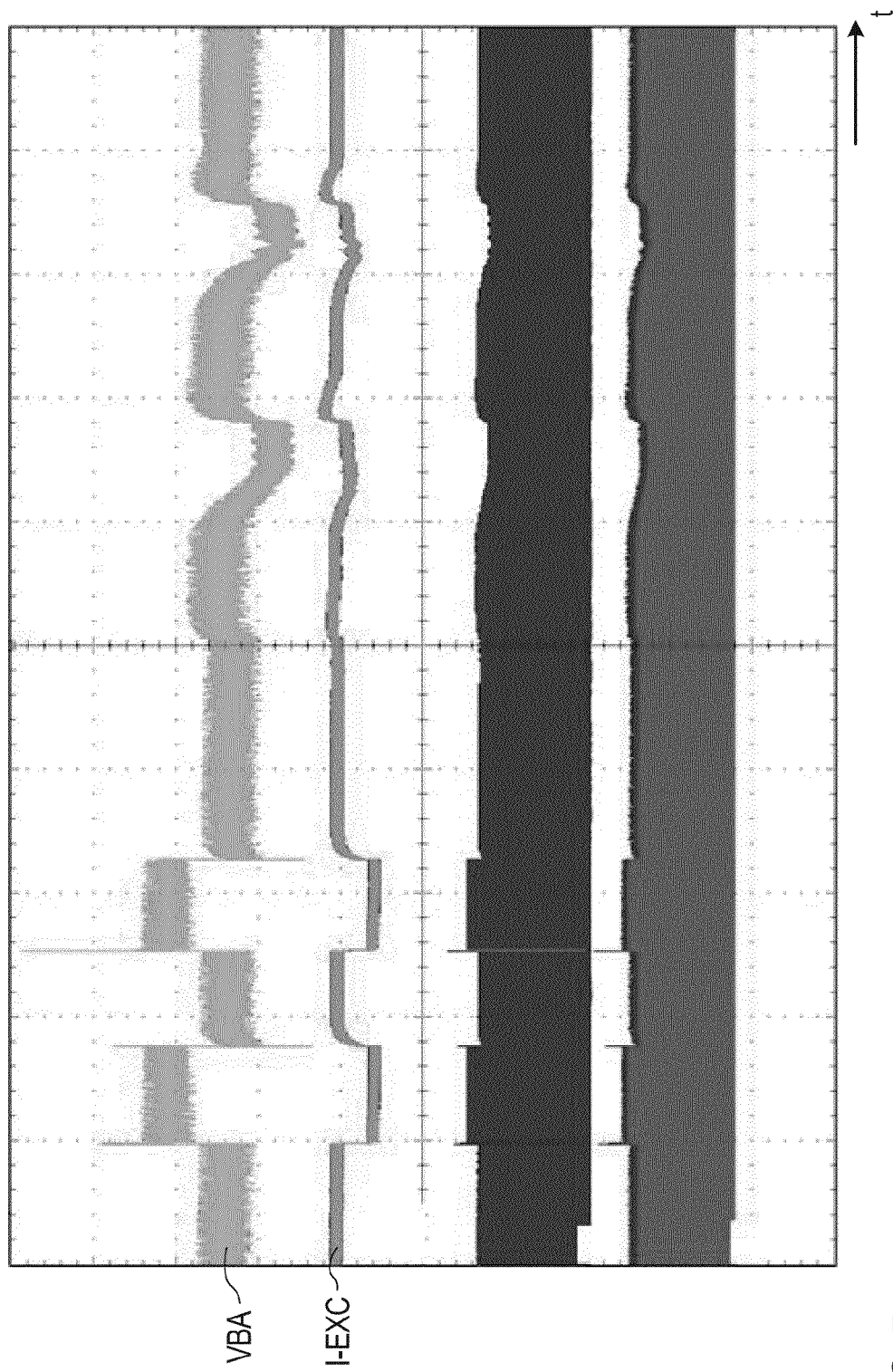
FIG. 5 is a diagram illustrating dynamic current regulation employing duty cycle limitation.

FIG. 4 shows the control behaviour of a generator with duty cycle based field current limitation and FIG. 5 shows the control behaviour of a generator with current based field current limitation, wherein both diagrams show on their left hand parts the regulation behaviour when load changes occur, and on their right hand parts the regulation behaviour when changes of the generator revolutions per time period occur. As can be seen from FIGS. 4 and 5, the duty cycle regulated systems and methods described above in connection with FIGS. 2 and 3 differ from current regulated systems and methods in the graphs I-EXC of FIGS. 4 and 5, which depict the behaviour of the field current in the current based model and the duty cycle based model over time t. The field current in the duty cycle based model exhibits a more gradual slope and more distinct variations of the battery voltage. The performance of the duty cycle based model can be further improved by emulating the time constant of the field winding system of the generator. The emulation may be performed, for example, by a low-pass filter such as low-pass filter 204 in the system shown in FIG. 2 or low-pass filter 329 in the system shown in FIG. 3. The time constant may be in the range between 50 ms and 200 ms, e.g., 100 ms.

Figure 6:
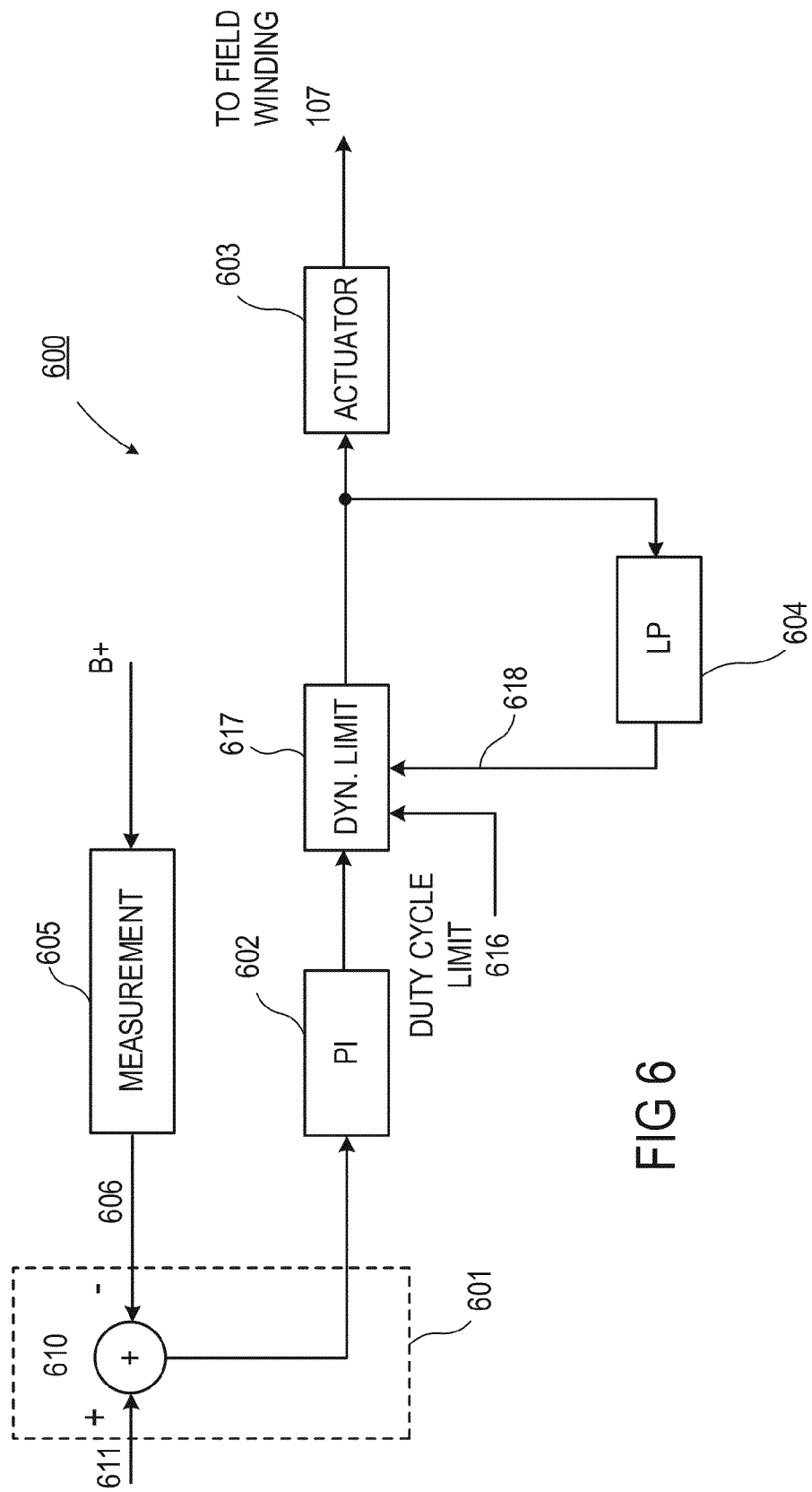
FIG. 6 is a block diagram illustrating another exemplary voltage regulator with duty cycle limitation applicable in the system of FIG. 1.

Referring to FIG. 6, an alternative field regulator 600 applicable as field regulator 101 in the system shown in FIG. 1 for providing a regulated field current to the generator 100 to obtain a regulated output voltage of the generator 100 includes an error evaluator 601, a proportional-integral (PI) controller 602 connected downstream of the error evaluator 601, an actuator 603 connected downstream of the PI controller 602, a dynamic signal limiter 617 connected downstream of the PI controller 602, a low-pass filter 604 and an actuator 603 connected downstream of the dynamic signal limiter 617, and a voltage measurement module 605 which is connected to battery terminal B+ and provides a signal 606 representing the terminal voltage. The error evaluator 601 includes a subtractor 610 which subtracts signal 606 from a setpoint voltage 611 representing voltage setpoint 104 in the system shown in FIG. 1. An output signal 618 represents a low-pass filtered output signal of dynamic signal limiter 617.

The dynamic signal limiter 617 further receives a duty cycle limit 616 and the signal 618 from low-pass filter 604. The duty cycle limit (value) 616 may represent a maximum duty cycle value and thus relates to the maximum current flowing through the field winding 107 and is referred to herein as field current 110 (see FIG. 1).

Figure 7:
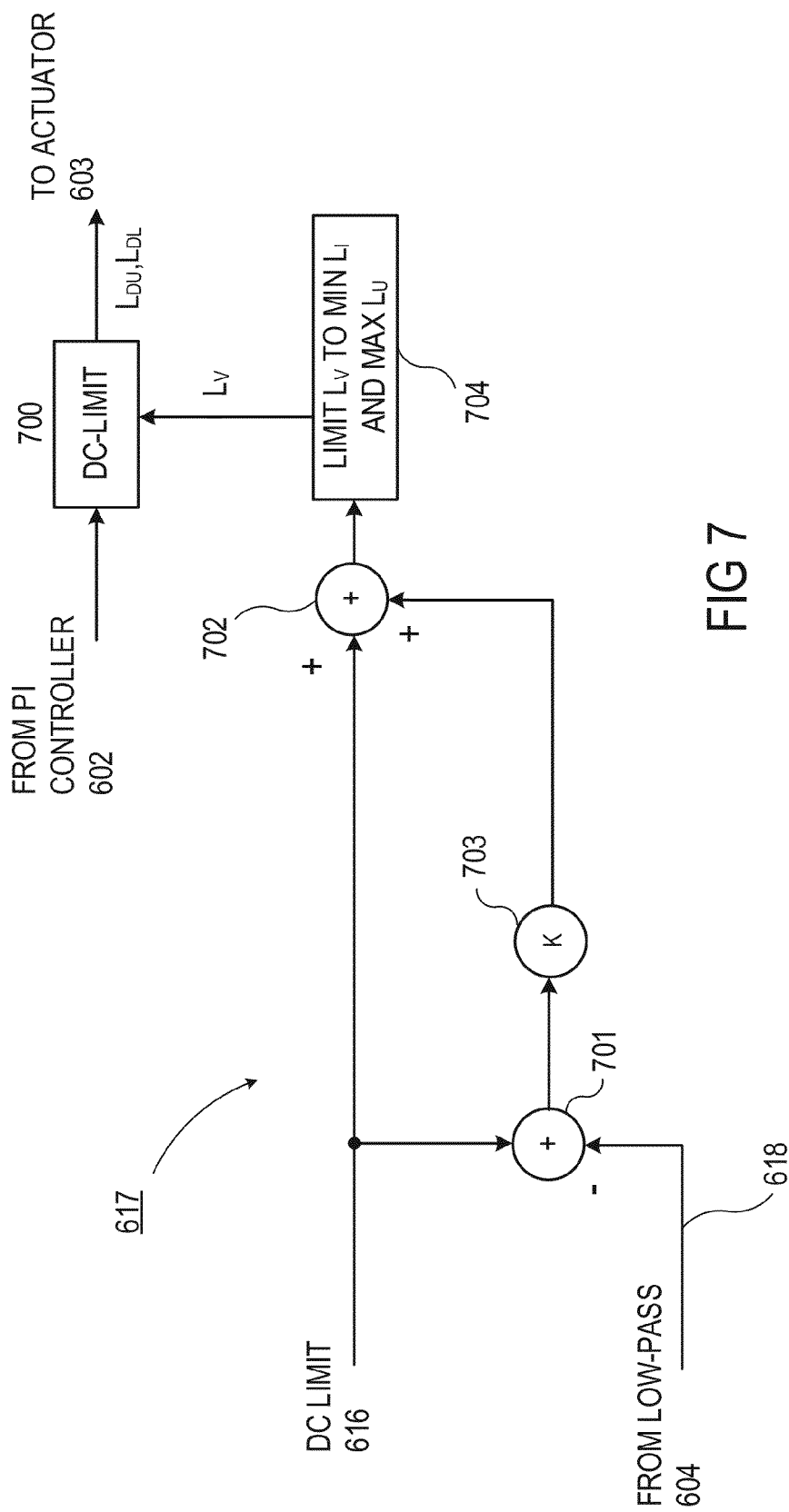
FIG. 7 is a block diagram illustrating an exemplary dynamic limiter applicable in the system of FIG. 6.

An example of a dynamic limiter 617 is now described in connection with FIG. 7. Dynamic limiter 617 comprises a limiter module 700 that is connected between PI controller 602 and actuator 603, and that keeps the output signal from PI controller 602 between a dynamic lower limit $L_{DL}$ and an upper limit $L_{DU}$. The lower limit $L_{DL}$ and the upper limit $L_{DU}$ are controlled by limit control signal $L_V$ which itself is limited to an upper limit $L_u$ and a lower limit $L_l$. Limit control signal $L_V$ is provided by a circuitry that may include a subtractor 701, an adder 702, a coefficient element 703, and a limiter module 704. Subtractor 701 subtracts the output signal 618 of low-pass filter 604 from the output signal 616 of PI controller 702. Adder 702 adds the signal 616 with an output signal of subtractor 701 multiplied by a factor K in subsequent coefficient element 703. Furthermore, adder 702 provides the limit control signal $L_V$ which itself is limited by the limiter module 704 to the lower limit $L_l$ (minimum) and upper limit $L_u$ (maximum).

The field regulator 600 described above with reference to FIG. 6 may be employed, for example, in motor vehicles for controlling the alternator. A duty cycle maximum is set by way of duty cycle limit 616. For example, a motor control device may limit the mechanical load of the generator in a targeted manner and no current measurement is necessary to limit the current, as is shown in FIGS. 6 and 7. Accordingly, the duty cycle deviation influences the calculation of the system deviation so that no switch-over between two different regulators (voltage regulator, current regulator) with unwanted disruptive switch-over effects occur.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system configured to provide a regulated generator field current to a generator to acquire a regulated output voltage of the generator, the system comprising:
 a controller configured to provide an actuator control signal on the basis of an error signal;
 an actuator configured to provide on the basis of the actuator control signal a pulse-width modulated output voltage that is configured to drive the regulated generator field current into the generator, the pulse-width modulated output signal having a duty cycle controlled by the actuator control signal; and
 an error evaluator configured to provide the error signal based on a combination of a first deviation signal and a second deviation signal, wherein the first deviation signal represents a difference between a voltage setpoint value and a generator output voltage and the second deviation signal represents a difference between a duty cycle limit value and a signal representing the low-pass filtered actuator control signal.

2. The system of claim 1, wherein the duty cycle limit value represents a desired maximum duty cycle of the generator field current and the voltage setpoint value represents the regulated output voltage of the generator.

3. The system of claim 1, wherein the error evaluator is further configured to provide the error signal based on a weighted combination of the first deviation signal and the second deviation signal, wherein for weighted combining the error evaluator is configured to apply at least one of a first weighting factor to the first deviation signal and a second weighting factor to the second deviation signal before combining.

4. The system of claim 3, wherein the first weighting factor is inversely proportional to the first deviation signal and the second weighting factor is proportional to the second deviation signal.

5. The system of claim 3, wherein at least one of first weighting factor and second weighting factor includes lower and upper limitation values, with the lower limitation value, the error signal depending only on the second deviation signal, and with the upper limitation value, the error signal depending only on the first deviation signal, or vice versa.

6. The system of claim 3, wherein for weighted combining the error evaluator is configured to provide the error signal based on the first deviation signal multiplied by a square portion of the first weighting factor, and from the second deviation signal multiplied by a linear portion of the second weighting factor.

7. The system of claim 1, further comprising a low-pass filter connected between the controller and the error evaluator, the low-pass filter being configured to filter the actuator control signal supplied to the error evaluator.

8. The system of claim 7, wherein the generator has low-pass filter characteristics on the field current and the low-pass filter has characteristics that model the low-pass characteristics of the generator.

9. The system of claim 8, wherein the low-pass characteristics of the generator include a time constant.

10. A method configured to provide a regulated generator field current to a generator to acquire a regulated output voltage of the generator, the method comprising:
 providing an actuator control signal on the basis of an error signal;
 providing on the basis of the actuator control signal a pulse-width modulated output voltage that is configured to drive the regulated generator field current into the generator, a generator output signal having a duty cycle controlled by the actuator control signal; and
 providing the error signal based on a combination of a first deviation signal and a second deviation signal, wherein the first deviation signal represents a difference between a voltage setpoint value and a generator output voltage and the second deviation signal represents a difference between a duty cycle limit value and a signal representing the low-pass filtered actuator control signal.

11. The method of claim 10, wherein the duty cycle limit value represents a desired maximum duty cycle of the generator field current and the voltage setpoint value represents the regulated output voltage of the generator.

12. The method of claim 10, further comprising:
 providing the error signal based on a weighted combination of the first deviation signal and the second deviation signal, wherein for weighted combining at least one of a first weighting factor is applied to the first deviation signal and a second weighting factor to the second deviation signal before combining.

13. The method of claim 10, wherein the first weighting factor is inversely proportional to the first deviation signal and the second weighting factor is proportional to the second deviation signal.

14. The method of claim 10, wherein at least one of first weighting factor and second weighting factor includes lower and upper limitation values, with the lower limitation value, the error signal depending only on the second deviation signal, and with the upper limitation value, the error signal depending only on the first deviation signal, or vice versa.

15. The method of claim 10, further comprising:
 providing, for weighted combining, the error signal based on the first deviation signal multiplied by a square portion of the first weighting factor, and from the second deviation signal multiplied by a linear portion of the second weighting factor.

16. The method of claim 10, further comprising:
 a low-pass filtering configured to filter the actuator control signal supplied to the error evaluator.

17. The method of claim 16, wherein the generator has low-pass filter characteristics on the field current and the low-pass filter has characteristics that model the low-pass characteristics of the generator.

18. The method of claim 17, wherein the low-pass characteristics of the generator include a time constant.

19. A system configured to provide a regulated generator field current to a generator to acquire a regulated output voltage of the generator, the system comprising:
 a controller configured to provide an actuator control signal on the basis of an error signal;
 an actuator configured to provide on the basis of the actuator control signal a pulse-width modulated output voltage that is configured to drive the regulated generator field current into the generator, the pulse-width modulated output signal having a duty cycle controlled by the actuator control signal; and a duty cycle limiter configured to limit the duty cycle of the pulse-width modulated output signal based on a difference between a duty cycle limit value and a signal representing the low-pass filtered actuator control signal.

20. The system of claim 19, further comprising a low-pass filter configured to low-pass filter the actuator control signal, wherein the generator has low-pass filter characteristics on the field current and the low-pass filter has characteristics that model the low-pass characteristics of the generator.

21. A method configured to provide a regulated, limited generator field current to a generator to acquire a regulated output voltage of the generator, the method comprising:

providing an actuator control signal on the basis of an error signal;

providing on the basis of the actuator control signal a pulse-width modulated output voltage that is configured to drive the regulated, limited generator field current into the generator, a generator output signal having a duty cycle controlled by the actuator control signal; and limiting the duty cycle of the pulse-width modulated output signal based on a difference between a duty cycle reference signal and a signal representing the low-pass filtered actuator control signal.

22. The method of claim 21, further comprising low-pass filtering configured to low-pass filter the actuator control signal, wherein the generator has low-pass filter characteristics on the field current and the low-pass filtering has characteristics that model the low-pass characteristics of the generator.

\* \* \* \* \*